United States Patent [19]

Joseph et al.

[11] Patent Number: 6,126,781
[45] Date of Patent: Oct. 3, 2000

[54] PROCESS FOR CONDITIONING OZONE GAS RECYCLE STREAM IN OZONE PULP BLEACHING

[75] Inventors: James Joseph, Yardley, Pa.; Michael A. Pikulin, Bound Brook, N.J.; William H. Friend, Savannah, Ga.

[73] Assignee: Union Camp Patent Holding, Inc., Wilmington, Del.

[21] Appl. No.: 07/739,050

[22] Filed: Aug. 1, 1991

[51] Int. Cl.[7] .............................. D21C 11/06; D21C 9/153
[52] U.S. Cl. .............................. 162/29; 162/30.1; 162/56; 162/65
[58] Field of Search ................................. 162/56, 65, 83, 162/89, 29, 30.1, 30.11; 422/31, 186.07, 186.14, 186.1

[56] References Cited

U.S. PATENT DOCUMENTS

| | | | |
|---|---|---|---|
| 2,466,633 | 4/1949 | Brabender et al. | 8/104 |
| 2,700,648 | 1/1955 | Thorp et al. | 204/176 |
| 3,151,943 | 10/1964 | Fujimoto et al. | 23/221 |
| 3,421,999 | 1/1969 | Corwin | 13/12 |
| 3,525,665 | 8/1970 | Gessner | 162/65 |
| 3,668,063 | 6/1972 | Engstrom | 162/65 |
| 3,715,430 | 2/1973 | Ryan | 424/127 |

(List continued on next page.)

FOREIGN PATENT DOCUMENTS 88002883  1/1988  Japan .

OTHER PUBLICATIONS

Perkins, "Equipment for Rapid Press–Caustic Extraction" *Tappi Alkaline Pulp Conference*; Oct. 1975 Williamsburg, VA pp. 162–189.

Kurtz, "Deaeration: Some Practical Applications and Benefits for Pulp and Paper Mills" *Tappi Eng. Conf.*, Sep. 19–21, 1978 San Francisco, CA pp. 399–357.

Cromwell and Manley, "Effect of Gaseous Diluents on Energy Yield of Ozone Generation from Oxygen" *Ozone Chemistry and Technology*, Advances in Chemistry Series No. 21, pp. 309–310 (American Chemical Society, Mar. 1959).

Jaisli and Klein, "System for the Economical Production of Ozone for Large–Scale Application in the Cellulose Bleaching Process", *dpw—Deutsche Papierwirtschaft* (1987/3) pp. T54–T66.

Nebel, *Ozone*, Encyclopedia of Chemical Technology, vol. 16, pp. 691–696.

Perkins and Schleinkofer, *Advances in Ozone Bleaching—Part III*.

Rothenberg, et al., "Bleaching of Oxygen Pulp with Ozone", *Tappi Journal*, Aug. 1975, pp. 182–185.

Soteland, "Bleaching of Chemical Pulps with Oxygen and Ozone", *Pulp and Paper Magazine of Canada*, T153–58 (1974).

Tritschler and Shelton, "Commercial Manufacture and Industrial Use of Ozone as an Oxidant".

*Primary Examiner*—Steve Alvo
*Attorney, Agent, or Firm*—Pennie & Edmonds LLP

[57] ABSTRACT

A process for conditioning an ozone gas recycle stream in an ozone pulp bleaching process, wherein the level of carbon dioxide in the recycle stream is controlled to allow full capacity operation of the ozone generator. Carbon dioxide concentration is identified over the relevant operational ranges and maximum concentration is identified for full capacity/optimum efficiency operation. Specific methods are described for controlling carbon dioxide concentration including purging a portion of the recycle stream, countercurrent scrubbing of the recycle stream with an alkaline solution and passing the recycle stream through an adsorbent material. Contaminants entering the system also may be reduced by directing the purged recycle stream, which is relatively oxygen rich, into the dewatering press where pulp consistency is increased. In this manner nitrogen surrounding the pulp is displaced by oxygen and thus, does not enter the bleaching/ozone system with the pulp.

19 Claims, 6 Drawing Sheets

U.S. PATENT DOCUMENTS

| | | | |
|---|---|---|---|
| 3,748,262 | 7/1973 | Lee et al. | 1/38 |
| 3,764,464 | 10/1973 | Samuelson | 162/65 |
| 3,963,625 | 6/1976 | Lowther | 13/11 |
| 4,132,637 | 1/1979 | Key et al. | 1/6 |
| 4,196,043 | 4/1980 | Singh | 162/30 |
| 4,279,694 | 7/1981 | Fritzvold et al. | 1/14 |
| 4,287,130 | 9/1981 | Dohm et al. | 260/413 |
| 4,399,292 | 8/1983 | Rossi et al. | 323/2 |
| 4,430,306 | 2/1984 | Namba et al. | 2/20 |
| 5,039,314 | 8/1991 | Lehner et al. | 55/26 |
| 5,164,043 | 11/1992 | Griggs et al. | 162/65 |

PROCESS FOR CONDITIONING OZONE GAS RECYCLE STREAM IN OZONE PULP BLEACHING

BACKGROUND OF THE INVENTION

The present invention relates to the conditioning of a recycle stream for use in ozone generation processes. More particularly, the present invention relates to the elimination of contaminants from an ozone recycle stream resulting from ozone bleaching of wood pulp.

In general, techniques for generation of ozone are well known to those skilled in the art. While a great variety of methods are known, only two are of significant commercial importance. These methods are ultra-violet radiation of air or oxygen, and corona or electrical discharge in air or oxygen. The ultra-violet radiation method is capable of producing only low concentrations of ozone and is thus generally limited to food preparation processes. The relatively high concentrations of ozone required for processes such as waste treatment or pulp bleaching necessitate the use of the corona or electrical discharge method.

Due to impurities in air, ozone generation using air is limited to concentrations of about 4% by weight. Use of pure oxygen allows the concentration to be increased; however, pure oxygen can be an expensive raw material. It is therefore desirable to recycle the oxygen containing gas discharged after the ozone is used for its intended purpose. When this gas is recycled, various contaminants must be removed from the recycle stream to maintain a minimum efficiency in the ozone generation process.

A number of different techniques are known in the art for removing contaminants, including carbon dioxide, from an ozone generation recycle stream. For example, U.S. Pat. No. 3,151,943 discloses a method for purifying exit oxygen in an ozone generation system. This reference is typical of the prior art references in that it recognizes that contaminants affect the efficiency of ozone generation, but does not discuss a specific relationship between contaminant level and generation efficiency. Generally contaminants were looked upon as diluents which displace oxygen.

U.S. Pat. Nos. 3,963,625, 3,748,262 and 4,430,306 disclose the use of molecular sieve materials or adsorbent materials such as zeolite and aluminosilicate to remove contaminants in an ozone generation recycle system. U.S. Pat. Nos. 4,287,130 and 4,399,292 each disclose countercurrent scrubbing with alkaline materials such as sodium hydroxide to remove organic compounds from the recycle stream. The '130 patent also discusses scrubbing with bicarbonate solutions to remove carbon dioxide, as well as tapping out inorganic components of the exhaust gas. U.S. Pat. No. 4,132,637 discloses an ozone waste treatment system wherein only a portion of the "off gas" is recycled to the ozone generator in order to reduce the amount of contaminants in the feed gas.

In addition to the above references, U.S. Pat. Nos. 2,700,648, 3,421,999, and 3,715,430, each disclose the removal of carbon dioxide in an ozone generation feed gas, although not utilizing a recycle system. The '430 and '999 patents use activated charcoal filters. The '648 patent contemplates the use of adsorbers or scrubbers which utilize sodium hydroxide or soda lime.

The references discussed above all describe methods and apparatus for removing various contaminants from a recycle stream or eliminating carbon dioxide from an ozone generation feed gas. However, none of these references discuss specific levels of contaminants or contaminant removal. Additionally, none of the above references disclose ozone generating and recycle gas conditioning under conditions associated with ozone bleaching of wood pulp. U.S. Pat. No. 4,279,694 shows a block diagram of an ozone recycle system in a pulp bleaching process. However, no details of operation are disclosed and, like the references discussed above, required levels of contaminant removal are not discussed. Ozone pulp bleaching can produce high levels of carbon dioxide; levels which apparently were not appreciated in the various systems disclosed in the prior art.

Prior art predicted ozone generating efficiency does not show a particular concern with respect to carbon dioxide levels over all operational ranges. As with other contaminants, carbon dioxide was considered primarily a diluent with any detrimental effects on ozone generation caused simply by a reduction in the amount of oxygen present. Cromwell and Manely, Effect of Gaseous Diluents on Energy Yield of Ozone Generation from Oxygen, *Ozone Chemistry and Technology*, Advances in Chemistry Series No. 21, pp. 309–10, (American Chemical Society, March, 1959) state that little loss in energy yield (ozone produced per unit energy applied) is expected for carbon dioxide concentrations in the feed gas up to 10 wt %. This has become generally accepted in the art.

Ozone generation efficiency depends on a variety of factors other than carbon dioxide content and overall oxygen purity. The general effect of various factors is discussed in Nebel, *Ozone*, "Encyclopedia of Chemical Technology", vol. 16, pp. 693–96 (3d ed., John Wiley & Sons 1981). Of the various factors discussed, generator size, power density, flow rate most directly impact on the cost of generation. Thus, it is possible to maintain apparent generation efficiency at high carbon dioxide contents. However, while increasing the generator size, reducing power density or reducing the actual flow rate maintains an apparent efficiency, capital costs are increased or productivity is decreased. As a result, no overall increase in cost efficiency of the ozone generation plant and recycle system is actually achieved.

SUMMARY OF THE INVENTION

It is therefore an object of the present invention to operate an ozone recycle system in a pulp bleaching process in a manner which utilizes the full generation capacity of the ozone generator. In achieving this object, it has been observed that the actual amount of carbon dioxide produced in a pulp bleaching process is greater than previously predicted. Also, carbon dioxide has much greater effect on the ozone generation efficiency than was previously recognized in the art. Thus, the present invention provides for removal of carbon dioxide and other contaminants in amounts sufficient to prevent build up in the ozone recycle stream of a pulp bleaching process. This provides the advantage of maintaining a higher ozone generation efficiency in a smaller size generator than was previously possible, thereby reducing the overall cost of operating such a system.

The process according to the present invention generally includes the following steps: An oxygen containing feed gas is provided to an ozone generator. Ozone is generated from the oxygen containing gas to produce an ozone rich oxygen gas which preferably has an ozone concentration of about 6 wt %. Pulp is bleached with the ozone rich gas and, as a result, produces an exhaust gas containing contaminants including relatively large amounts of carbon dioxide. Contaminants are removed from the exhaust gas to produce a recycle gas. The recycle gas is directed into the ozone generator to provide at least a portion of the oxygen containing feed gas used to generate the ozone. In order to allow the ozone generator to operate at full capacity, or at least approaching full capacity, a sufficient amount of carbon dioxide is removed from the exhaust gas to produce the recycle gas. The amount removed preferably maintains the carbon dioxide concentration at about 6 wt % or less in the feed gas.

In one preferred embodiment of the present invention, carbon dioxide is removed by purging a portion of the exhaust gas. The unpurged portion becomes the recycle gas that is mixed with a fresh oxygen containing gas. The mixture forms the feed gas and is then directed into the ozone generator.

In an another preferred embodiment of the present invention, carbon dioxide is removed by passing the exhaust gas through a pressure swing adsorbtion unit.

In a further preferred embodiment of the present invention, carbon dioxide is removed by counter-current scrubbing of the exhaust gas with an alkaline material. Alkaline materials may be conveniently obtained from sources associated with pulping and bleaching processes, such as oxidized white liquor.

A further embodiment of the invention utilizes at least a portion of the purged exhaust gas by directing it into the hood of a dewatering press located in the associated pulp processing stream, upstream of the bleaching reactor. The dewatering press is used to increase the consistency of the pulp by squeezing it to force out water. When the pulp expands after squeezing, it normally absorbs the surrounding air which is primarily nitrogen. This nitrogen normally would be introduced into the bleaching reactor with the pulp and form part of the exhaust gas from the reactor. However, by directing at least a portion of the oxygen rich exhaust gas to the dewatering press, the ambient air is displaced and nitrogen does not enter the pulp in large quantities.

The invention further comprises an apparatus for reducing the concentration of nitrogen gas in pulp while increasing the consistency of the pulp. The apparatus comprises means for increasing the consistency of the pulp by removing liquid therefrom and means for forming a blanket of oxygen rich gas which substantially surrounds and contacts the pulp as the consistency thereof is increased. The oxygen rich gas fills voids created within the pulp by the action of the consistency increasing means. The blanket of oxygen rich gas is created by surrounding the pulp consistency increasing means with hood means. The apparatus further comprises means for directing an oxygen rich gas, preferably a portion of the exhaust gas from an associated ozone recycle system, containing at least about 80% oxygen into the hood means.

The pulp consistency increasing means comprises at least two rollers for pressing the pulp. Upon exiting the rollers the pulp expands as noted above, forming voids within the pulp particles which then fill with the oxygen rich gas.

BRIEF DESCRIPTION OF THE DRAWING

The features and advantages of the invention will be readily apparent from the following detailed description of the preferred embodiments, illustrated in the drawing figures, wherein.

DETAILED DESCRIPTION OF THE PREFERRED EMBODIMENTS

Figure 1:
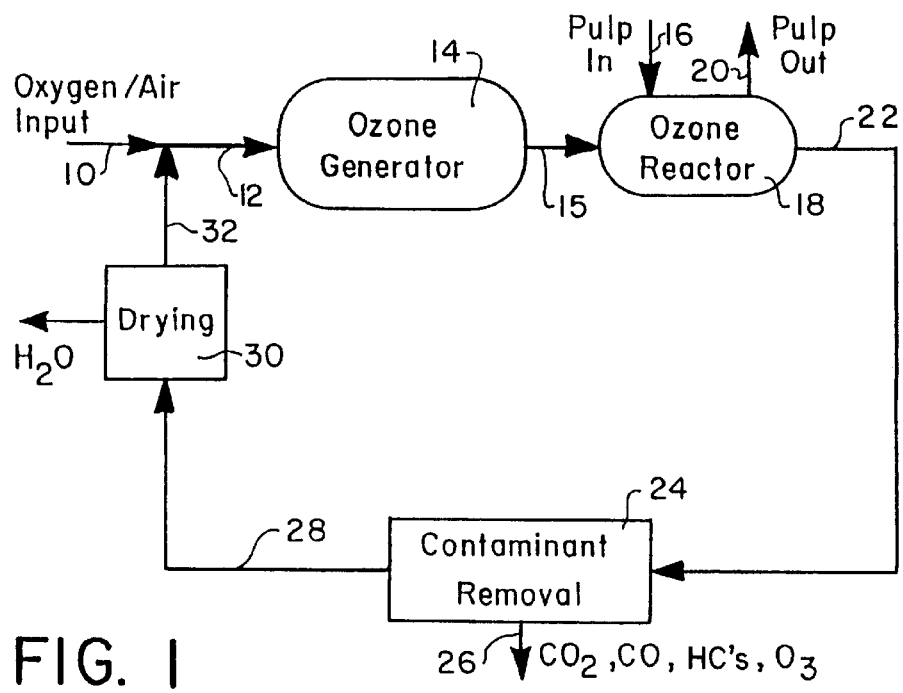
FIG. 1 is a process flow diagram generally illustrating the process according to the present invention.

The basic process according to the present invention is represented by the flow diagram in FIG. 1. A make-up gas of pure oxygen, an oxygen-air mixture, or purified air is fed into the system at oxygen-air input 10. This mixes with the recycle stream to form a feed gas 12 for ozone generator 14. Ozone rich gas 15 from ozone generator 14 is mixed with pulp 16 in the ozone reactor 18 to carry out the bleaching process. Bleached pulp 20 and exhaust gas 22 exit the ozone reactor 18, whereafter the exhaust gas 22 flows through contaminant removal stage 24. Contaminants 26 are removed by a number of different methods according to the present invention. After removal of contaminants 26, recycle gas 28 is dried in dryer 30. Dried recycle gas 32 is then directed into the feed gas for the ozone generator.

The various contaminants removed include carbon dioxide, carbon monoxide, hydrocarbons and residual ozone. Other contaminants may be removed as necessary. In particular, nitrogen can be removed if introduced with the pulp or input gas. The pulp bleaching process itself does not produce nitrogen as a by-product. Specific steps of contaminant removal according to the present invention are discussed in greater detail below.

As discussed above, in the prior art contaminants were generally appreciated only for their effect as diluents. A diluent simply has the effect of displacing oxygen in the feed gas and thus reducing the amount of oxygen present to be converted to ozone. However, the applicants have identified carbon dioxide as a particularly deleterious contaminant. That is, it has been discovered that carbon dioxide in the feed gas to the ozone generator has a negative impact on ozone generation beyond its effect as a diluent.

Figure 2:
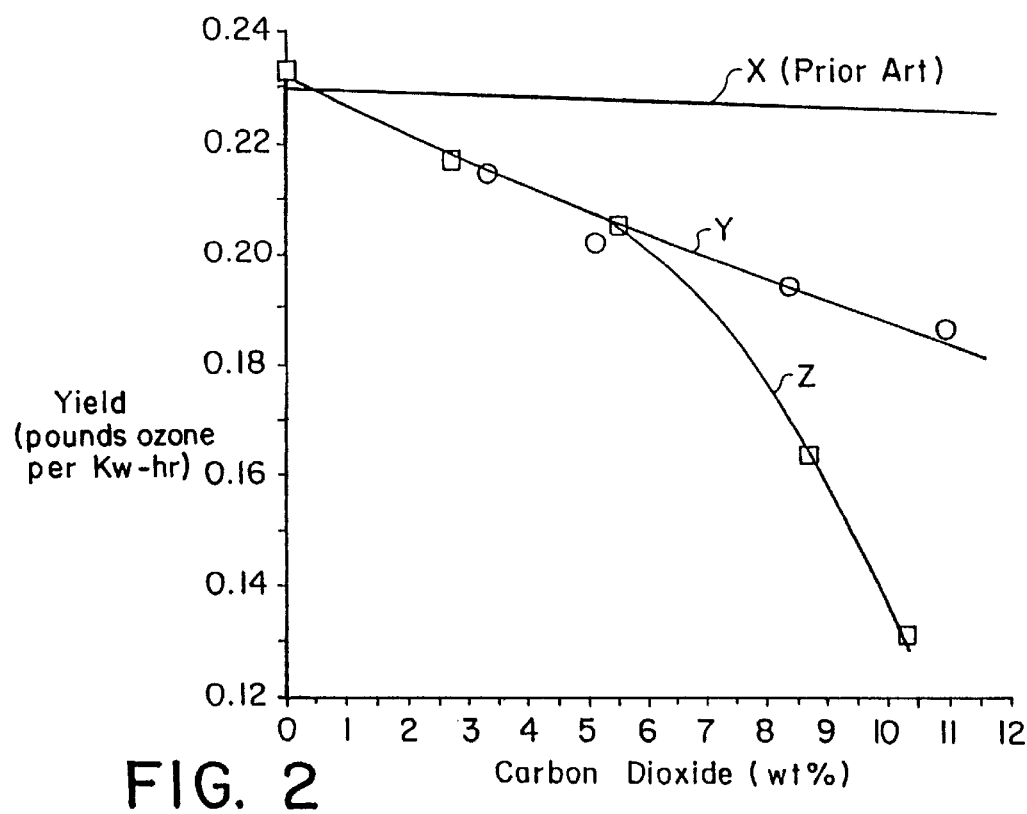
FIG. 2 is a graph plotting ozone yield (generation efficiency) in lbs/kW-hr versus the carbon dioxide content of the feed gas in weight percent.

The actual effect of carbon dioxide is illustrated in FIG. 2, which presents the ozone generation energy yield versus the carbon dioxide content of the feed gas for an ozone generation system as described below. Curve X represents the prior art predicted effect of carbon dioxide on energy yield in the system. As is apparent, the predicted effect is minimal over the range of interest. Furthermore, the prior art did not appreciate the interrelationship between flow rate and carbon dioxide content with regard to their impact on efficiency. This is because the prior art considered carbon dioxide as a diluent only. In fact, Cromwell and Manely, a leading source on the affect of gaseous diluents in ozone generation (discussed above in the Background of the Invention), equate the effects of argon and carbon dioxide at concentrations of up to about 10%. Both were said to produce little change in energy yield.

In contrast to the prior art prediction of little change, curves Y and Z represent the actual loss in ozone energy yield caused by carbon dioxide in the feed gas as determined by the applicants. Curve Y represents one-half the design flow rate and curve Z the full design flow rate. The inaccuracy of the prior art prediction is immediately apparent. It is believed that carbon dioxide has this exaggerated affect on energy yield as compared to that of a simple diluent because it unexpectedly reacts when subjected to the high voltage electrical discharge in the ozone generator. In this unexpected reaction the carbon dioxide is converted to carbon monoxide and in the process uses energy which would otherwise be used for ozone production. It is also believed that the negative effect is increased by the fact that the carbon dioxide/carbon monoxide reaction is a reversible reaction. Therefore, additional energy is lost in converting the carbon monoxide back into carbon dioxide and then the reaction repeats, using further energy.

The data points for the present invention shown in FIG. 2 were generated with a small test ozone generator having a full design, specific flow rate of about 0.83 lbs./hr.ft$^2$ (pounds per hour per square feet). The generator operated at between about 600–800 Hz and at approximately 10,000 volts. The relationship illustrated in FIG. 2 is not dependent on size and also holds true for larger systems. The test generator used was a scale down version of a commercially available generator, ABB/Ozonia OF219L. However, the specific flow rate of the commercial generator is about 0.93 lbs./hr.ft$^2$. The diffrence between the specific flow rates was due to the scaling down process.

As will be apparent to persons of ordinary skill in the art, the generator parameters may be varied according to known relationships based on the disclosure contained herein, without departing from the scope of the present invention.

Ozone bleaching of pulp under the above-described preferred conditions produces between about 0.1 to 0.5 pounds, usually within about 0.18 to 0.46 pounds and typically about 0.23 pounds of carbon dioxide per pound of ozone consumed in the bleaching process. This results in the production of typically about 3.3 pounds of carbon dioxide for every air dried ton (ADT) of pulp bleached. The applicants have determined that, for optimal bleaching, the ozone concentration in the gas stream entering the pulp bleaching reactor should not fall between approximately 6 wt % at the design floe rate. A suitable bleaching process and reactor is described in U.S. Pat. No. 5,818,989 which is specifically incorporated herein by reference.

To achieve this ozone concentration the carbon dioxide concentration in the feed gas should not exceed 6 wt %. Carbon dioxide concentration may be decreased below 6 wt % without negatively impacting generation efficiency. However, reductions below this level provide decreasing benefits and can actually decrease overall cost efficiency due to the added cost of unnecessarily removing additional carbon dioxide.

The amount of carbon dioxide produced by ozone pulp bleaching is relatively large: In general, it is much larger than the amounts of carbon dioxide generated in other prior art ozone applications. For example, according to the manufacturer the preferred ozone generators described above should be capable of producing 6 wt % concentration ozone at the design flow rate so long as the oxygen purity of the feed gas is maintained at 85 wt % (or more), regardless of the make-up of the remaining 15 wt %. However, if these generators are included in a recycle system as shown in FIG. 1 and operated according to the prior art with the contaminant removal accomplished by purging a portion of the exhaust gas and adding oxygen make-up gas to maintain the overall oxygen purity in the feed gas at 85 wt %, the carbon dioxide level in the feed gas would rise to about 9.3 wt %. This level, shown in Example I, would be considered acceptable according to the prior art. At this level of carbon dioxide concentration, the ozone generators described above would be unable to produce 6 wt % ozone rich gas without a significant reduction in flow rate.

There are a number of known ways to increase the ozone concentration in the gas exiting an ozone generator. The most direct solution in the prior art would have been to increase the power input to the ozone generator. However, because ozone generation efficiency decreases as power density increases, a point of diminishing returns is reached where ozone concentration cannot be further increased by this method. Increased power also involves increased cost. The further solution in the prior art would have been to increase the generator size, thus increasing efficiency by operating at a lower power density. Another prior art solution would be to decrease flow rate through the generator, but while concentration can be increased, the total volume of ozone produced is decreased due to the lower flow rate.

Each of the prior art solutions listed above results in an increase in the cost of ozone production, either due to decreased productivity or increased capital or operating costs. These increased costs arise because the generator is not operating at full capacity. Operation at full capacity occurs when the ozone generator is producing a maximum ozone concentration at a given generator size, power density and flow rate such that the only way to increase the concentration is to change one of those parameters and thereby incur a productivity loss or an increase in operating or capital cost. The practical effect of each of these changes is the same as increasing the size of the generator when the total amount of ozone produced is considered.

The effect of an increase in generator size under these circumstances is to create a wasted or excess generation capacity because the full capacity cannot be utilized due to the previously unrecognized effects of carbon dioxide. By employing the teachings of the present invention, the excess capacity used to compensate for the effects of carbon dioxide may be eliminated. Two possible, beneficial options result:

(1) generator size can be reduced to operate at full capacity, thereby reducing system capital costs; or (2) generator size can be maintained to allow for future production increases by utilizing generator capacity which, under the prior art, was wasted. The second option is particularly useful for an existing plant which may increase production by employing the present invention, without installing a new ozone generation system.

Figure 3:
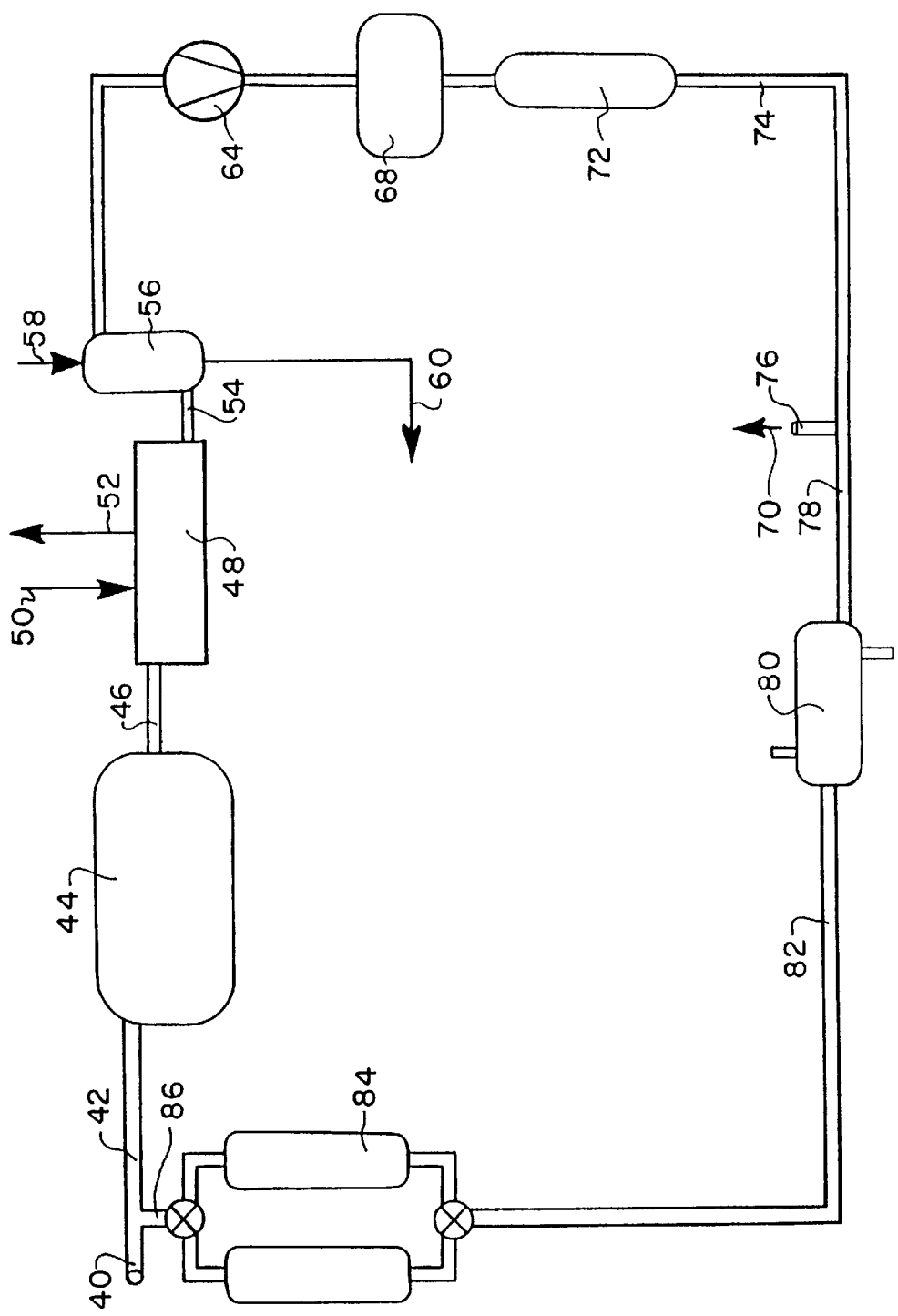
FIG. 3 is a schematic diagram illustrating two different preferred embodiments of the present invention which utilize essentially the same components.

FIG. 3 illustrates a preferred embodiment of the present invention, wherein the carbon dioxide level is controlled by continuously purging a portion of the exhaust gas. For ease of reference, this embodiment is referred to below as the "purge only" embodiment. In the system shown in FIG. 3, oxygen make-up gas 40 is mixed with dried recycle gas 86 to form a feed gas 42. Feed gas 42 is directed into ozone generator 44 and thereafter, ozone rich oxygen gas 46 passes through ozone reactor 48 where it bleaches pulp 50. Bleached pulp 52 is removed from ozone reactor 48 and exhaust gas 54 is directed to a counter-current scrubber 56.

Counter-current scrubber 56 uses water 58 as a scrubbing material to remove entrained pulp fibers from the exhaust gas in a solution 60. The operation of a counter-current scrubber in this manner will be understood by persons of ordinary skill in the art.

After scrubber 56, the exhaust gas pressure is maintained by compressor 64 and directed through thermal destruct 68 and catalytic destruct 72 for initial contaminant removal. Each of these components are also commercially available and understood by persons skilled in the art. Thermal destruct 68 removes carbon monoxide generated by the bleaching process and residual or unused ozone. Residual ozone exiting the reactor is considered a contaminant because it may not be directed back into the recycle stream dryer 84 or released to the atmosphere. Catalytic destruct 72 eliminates hydrocarbons and any remaining carbon monoxide.

The carbon dioxide level in the system is controlled by purging a portion of the exhaust gas at purge 76. The purged portion forms purge gas 70. After purge 76, the total mass of recycle gas 78 is reduced as compared to exhaust gas 74 by the mass of purge gas 70. The weight percent concentration of carbon dioxide and other contaminants remains constant between 74 and 78. When make-up gas 40 is mixed with the reduced mass recycle gas, the carbon dioxide concentration in feed gas 42 is maintained at the desired predetermined level.

After purge 76, recycle gas 78 is cooled in cooling unit 80. Cooled recycle gas 82 then is directed to a desiccant drier 84, which uses a silica gel and molecular sieve to eliminate moisture and produce a dried recycle gas 86. Cooling unit 80 and desiccant drier 84, are also commercially available components which operate in a known manner, as would be understood by those of skill in the art.

Another preferred embodiment according to the present invention may be described utilizing substantially the same components as shown in FIG. 3. However, in this embodiment counter-current scrubber 56 employs an alkaline scrubbing material 58 (rather than just water) to remove carbon dioxide, as well as entrained pulp fibers. Preferred scrubbing materials include caustic soda (NaOH), hydrated lime (Ca(OH)$_2$) and oxidized white liquor (OWL, which contains approximately 6.7 lbs. NaOH/cu.ft.). Other alkaline mixtures may also be suitable for this purpose.

With a pulp bleaching reactor that produces 3.3 lbs. CO$_2$/ADT pulp as described above, the amount of alkaline material required to remove 95% of the carbon dioxide per air dried ton (ADT) pulp is:

Caustic soda—5.69 lbs.

Hydrated lime—5.27 lbs.

OWL—6.35 gallons

In this embodiment (referred to below as the "alkaline scrub" embodiment) a purge is maintained in order to control the overall oxygen purity due to the presence of nitrogen introduced with the pulp or make-up gas and/or argon introduced with the make-up gas. Nitrogen and argon do act as diluents and the concentrations must be controlled to maintain oxygen purity. Purge levels required are explained in more detail below with reference to the examples.

The alkaline scrub embodiment is particularly well-suited for use in pulp bleaching processes. This is because of the abundance of alkaline sources in the pulping and bleaching systems. For example, oxidized white liquor may be supplied from the digestion-liquor recovery process of an associated pulping-plant. A source of caustic soda (NaOH) may be the pulp bleaching extraction ("E") stage. A small amount easily can be diverted to the alkaline scrubber for carbon dioxide removal.

Figure 4:
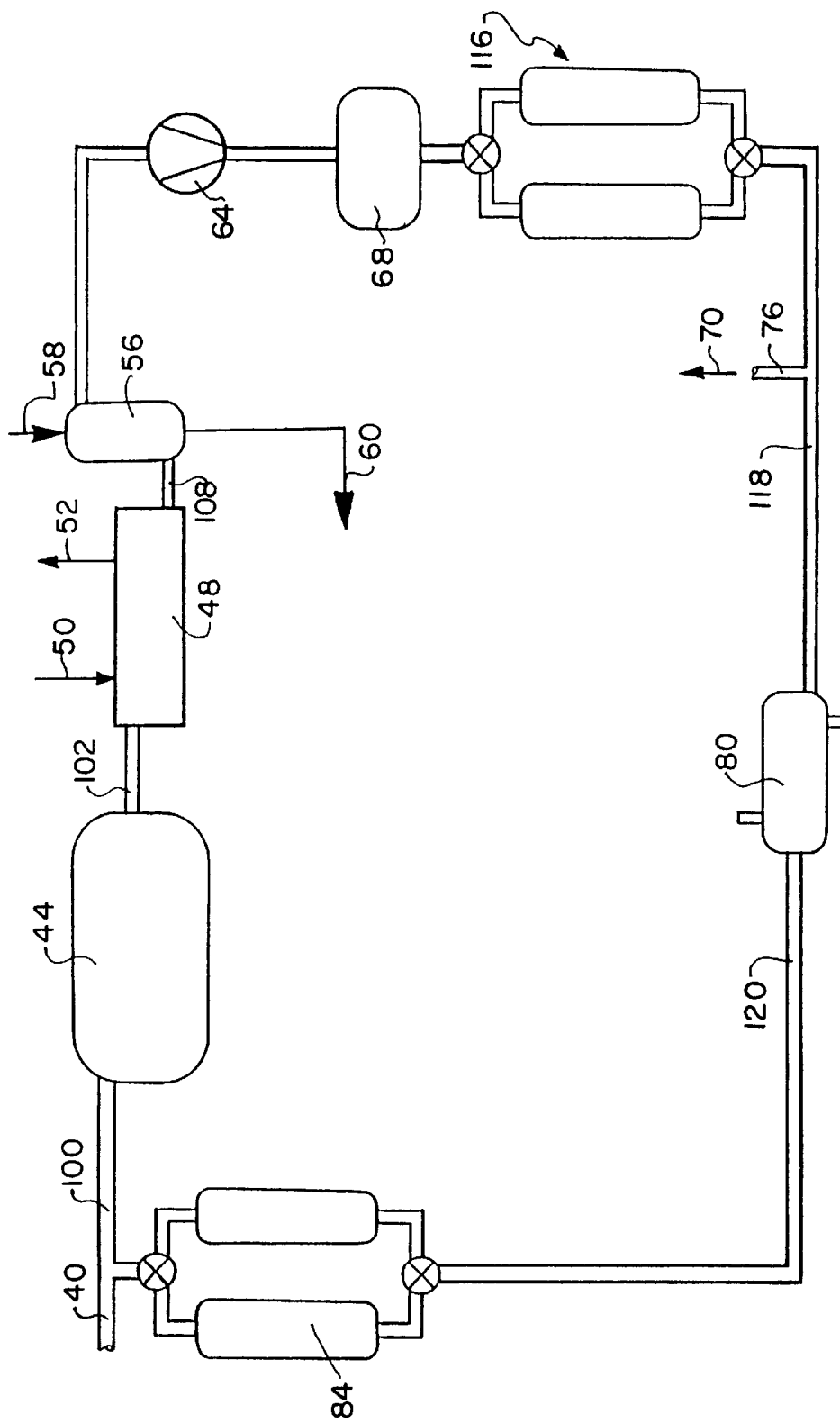
FIG. 4 is a schematic diagram illustrating a further preferred embodiment of the present invention.

FIG. 4 illustrates a further alternative preferred embodiment according to the present invention. In this embodiment, feed gas 100 is directed to ozone generator 44, which provides an ozone rich gas 102 for bleaching pulp 50 in ozone reactor 48. Again, bleached pulp 52 is removed from reactor 48, and exhaust gas 108 is directed to water scrubber 56 where entrained pulp fibers are removed in solution 60. As in FIG. 3, the exhaust gas again passes through compressor 64, and the resulting compressed gas passes through thermal destruct 68. However, after thermal destruct 68, the exhaust gas is directed to pressure swing adsorption ("PSA") unit 116 where carbon dioxide and other contaminants are removed.

The PSA unit replaces the catalytic destruct unit in FIG. 3. Depending on the selection and level of contaminants removed in PSA unit 116, varying amounts of purge gas 70 are removed through purge 76 as with the other embodiments. An amount of oxygen make-up gas 40 is added to replace the removed contaminants including the purge gas. In general, the operation of the PSA embodiment is analogous to the alkaline scrub embodiment because carbon dioxide is removed from the system by means other than purge 76.

Pressure swing adsorption devices suitable for PSA unit 116 are generally commercially available. The adsorbent selected must remove carbon dioxide in the levels described herein. Depending on the other contaminants present, adsorbents may be selected and combined by a person of ordinary skill in the art to achieve the desired level of overall contaminant removal. In general, adsorbents such as silica gels, activated alumina and zeolites, or mixtures thereof are suitable. A preferred combination of adsorbent materials is a 5A molecular sieve for removal of carbon dioxide and nitrogen, combined with silica gel for removal of hydrocarbons.

Figure 5:
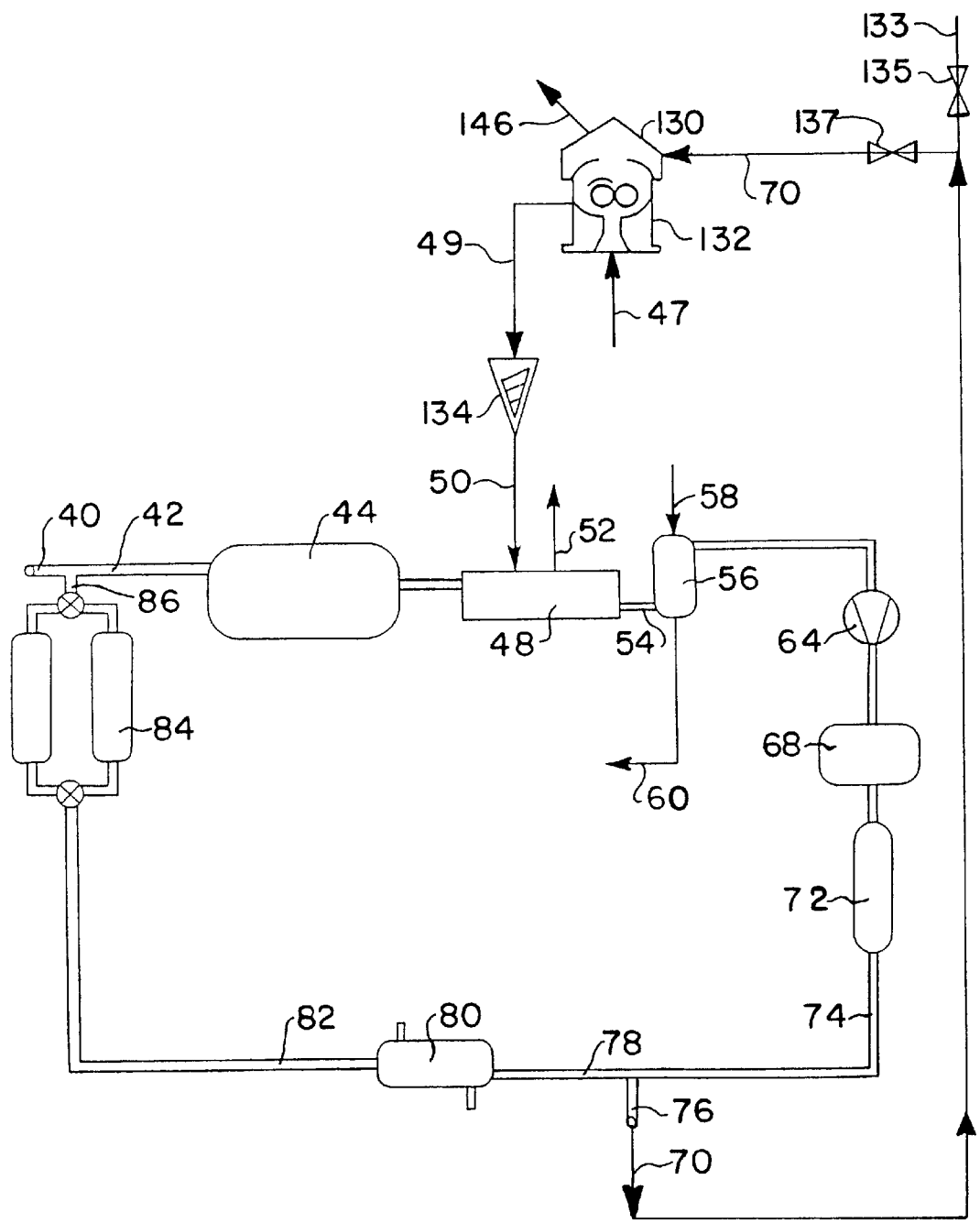
FIG. 5 a schematic diagram illustrating another preferred embodiment of the present invention wherein purged exhaust gas is directed to the hood of the dewatering press.

Although carbon dioxide content has been identified as a particular problem, the diluent effect of other contaminants, especially nitrogen, can not be ignored. A further preferred embodiment of the present invention, illustrated in FIG. 5, is directed to this problem. In this embodiment, purge gas 70 from purge 76 is directed to the hood 130 surrounding dewatering press 132 ("DWP"). The purge gas can also be directed to pulp stream 49 in discharge chute 143 (see FIG. 6). Press 132 raises the consistency of pulp 47 prior to its entering reactor 48 essentially by compressing the pulp between a nip formed by two rollers to "wring-out" water. Because the cellulose pulp fibers are elastic, they form a mat which expands upon leaving the press nip. Whatever gas surrounds the pulp at this point is drawn into voids between the pulp fibers due to the sponge-like expansion of the pulp. By flooding hood 130 with purge gas 70, the purge gas surrounds the pulp instead of ambient air. Thus, as the pulp particles expand after exiting the rollers of the press, the voids within the pulp are filled with the purge gas, which includes only about 15% diluents. Air which otherwise would surround the pulp includes approximately 79% diluents, primarily nitrogen. After leaving the flooded hood 130, pulp 49 is directed to a suitable reactor feed device, such as screw feeder 134. From feed device 134, pulp 50 is subsequently fed into reactor 48.

By recycling purged exhaust gas 70 to hood 130, the exhaust gas exiting ozone reactor 48 can be considerably higher in oxygen content than it would be without the introduction of the purge gas to the hood of the DWP. Thus, under many circumstances directing the purge gas to the DWP lowers the oxygen makeup requirement in the feed gas going into the ozone generator and thereby creates substantial additional cost savings. While the overall oxygen purity of the feed gas can be maintained in this manner, at the same time the carbon dioxide concentration must be kept at low levels as previously explained. In some circumstances it may not be desirable to utilize the entire purge gas in the DWP (see Example IV) due to the large amount of contaminants, particularly carbon dioxide, which would be reintroduced into the system with the pulp. If such were the case, it may be desirable to direct only a portion of the purge gas to the DWP or none at all. Vent 133 and control valves 135 and 137 allow the amount of purge gas 70 directed to the DWP to be precisely controlled to achieve a desired balance of oxygen purity and carbon dioxide content.

Instead of the purge gas, any oxygen rich gas (i.e., one having an oxygen content of at least 50%, preferably 80% or more) can be used. Benefits are obtained by the substitution of any oxygen bearing gas having an oxygen concentration which is greater than that of ambient air, so long as the selected gas stream does not contain a significant amount of carbon dioxide.

Figure 6:
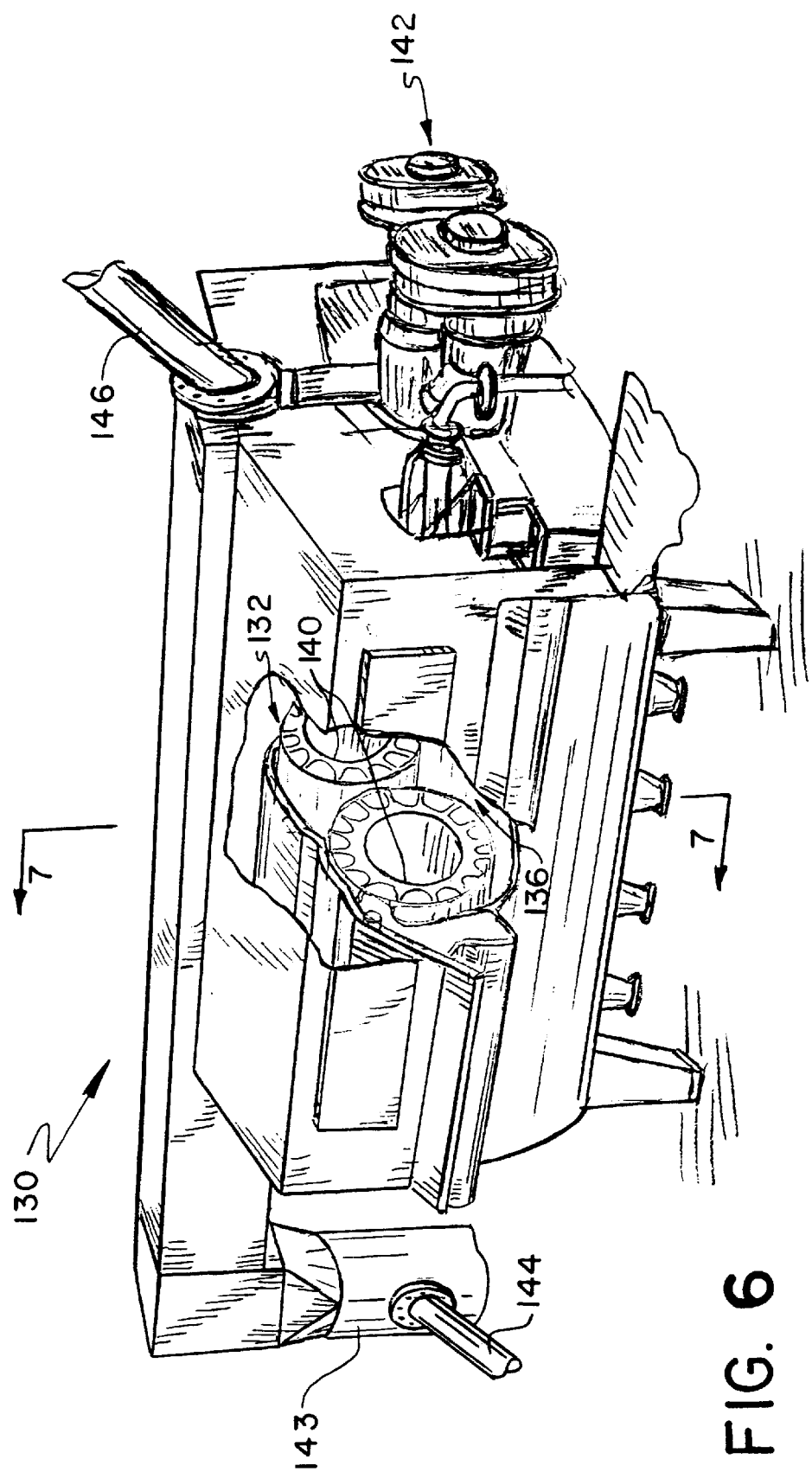
FIG. 6 is a perspective view, partially broken away, of a dewatering press provided with the modified hood of the present invention.
Figure 7:
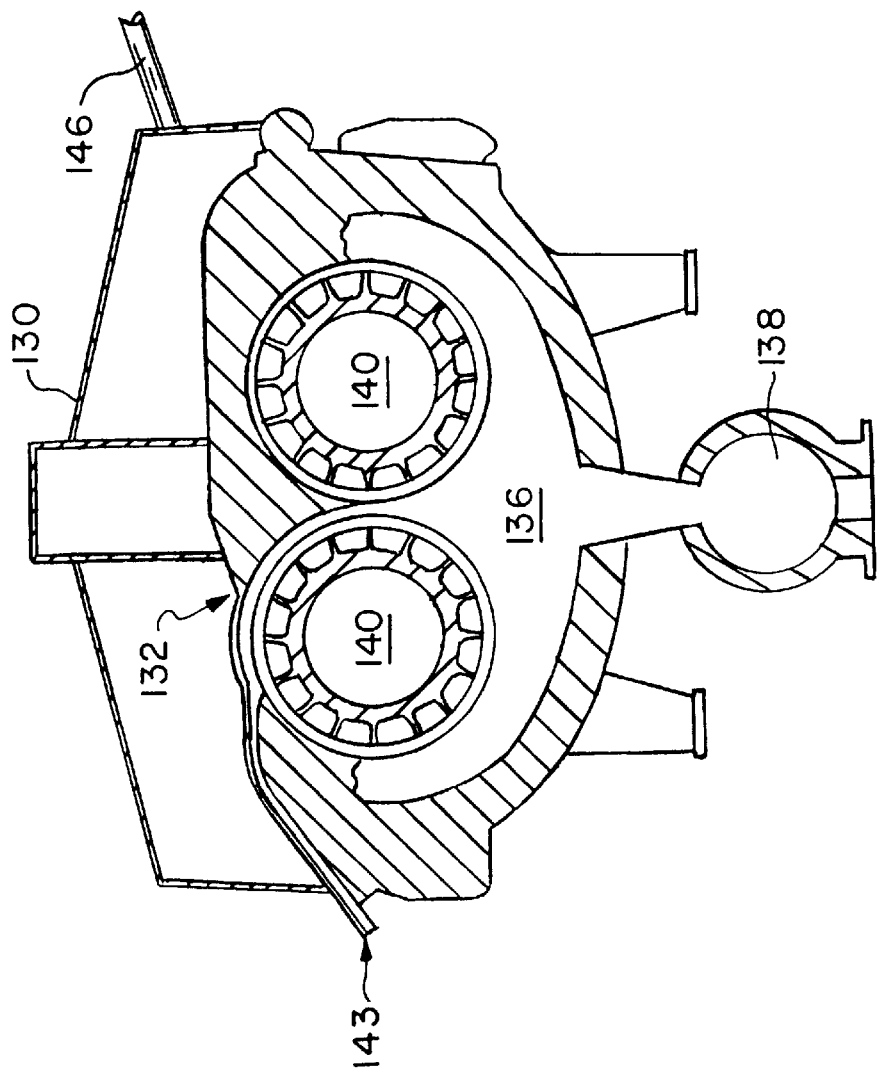
FIG. 7 is a sectional view of the apparatus of FIG. 6 taken along line 7—7.

Turning now to FIGS. 6 and 7, there is illustrated an embodiment of an apparatus according to the present invention for use in surrounding the pulp at the dewatering press with a blanket of exhaust gas from the ozone recycle system purge. The dewatering press 132 used with the invention as depicted in FIGS. 6 and 7 is well-known in the art and thus need not be described in detail here. It is sufficient to say that pulp 50 enters vat 136 through at least one pulp inlet 138 and continuously fills vat 136 located therein. The pulp in vat 136 is dewatered by passing between press rollers 140 so as to raise it from a relatively low consistency to a high consistency between about 25 and 50%, preferably between about 40–50% and most preferably about 42%. Press rollers 140 are synchronously counter-rotated by motor means 142. High consistency pulp 49 then exits hood 130 through discharge chute 143 whereupon it is conveyed to reactor feed device described above. Chute 143 is sealed in a manner to prevent contaminants in the pulp from entering the surrounding atmosphere.

Purged exhaust gas 70 enters chute 143 through pipe 144 and is directed counter-current to the flow of pulp 49. Exhaust gas 70 thus entirely fills the space within hood 130, blanketing the pulp as it passes through rollers 140. As noted above, as the particles of pulp 49 expand upon exiting rollers 140, the voids within the pulp are filled with the oxygen-rich exhaust gas and this pulp, with its relatively higher levels of oxygen and lower levels of diluents, is then subsequently fed into ozone reactor 48. Vent pipe 146 provides an exhaust to prevent overpressurization of hood 130 and to permit the elimination of disagreeable vapors. An exhaust fan (not shown) associated with vent pipe 146 removes the vapors from hood 130 and directs them to a bleach plant scrubber (not shown) for removing sulfur odor. Hoods of the type described herein may be fabricated, for example, from glass-fiber reinforced plastic and are available from Sunds Defibrator, AB of Sundsvall, Sweden, among others. The process of the invention may utilize more than one dewatering press if desired, although for purposes of convenience only one such press is indicated in the drawing figures.

EXAMPLES

The present invention will be further understood by reference to the following non-limiting examples. These examples are based on data generated by a computer model of the ozone generation and recycle system according to the present invention. The examples illustrate the principles of contaminant removal according to the present invention, with the ozone generation system according to the preferred embodiment described hereinabove used for illustration purposes only. Thus, reference to "the ozone generator" in the examples below is to that embodiment. The principles illustrated by these examples may be easily extended to other ozone generation systems by persons of ordinary skill in the art by following the teachings of the present invention.

In each of the examples below the make-up gas on which the model was based contained approximately: 99.5 wt % oxygen, 0.25 wt % nitrogen and 0.25 wt % argon. Amounts of make-up gas input are given in scfm at 298° K. Each of the tables show the concentrations of the gas components in weight percent, except methane (*) which is given in parts per million (ppm). Stream location in the tables refers to the points indicated by the corresponding reference numerals in FIGS. 3 and 5. Specifically, the feed gas to the ozone generator is indicated by 42; the exhaust gas by 54; the exhaust gas after initial contaminant removal by 74; and the recycle gas (after the purge) by 78. The purge rates given are actual purge rates; that is, they indicate the amount actually removed from the system at purge 76.

Example I

Example I illustrates the contaminant level which would be present if a recycle system such as shown in FIG. 3 were operated according to the teachings of the prior art. As discussed, the prior art considered carbon dioxide only for its effect as a diluent. Thus, the prior art predicts that the ozone generator should produce an ozone rich gas having 6 wt % ozone so long as the oxygen content of the feed gas is maintained at about 85 wt %. This level of oxygen purity may be accomplished by purging approximately 12% of exhaust gas 74 at purge 76. The oxygen and contaminant levels for various points in the system operated under these conditions are given in Table A:

TABLE A

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 78.8 | 9.5 | 5.8 | 0.3 | 0.4 | 91 | 0.2 | 5.1 |
| 74 Exhaust | 78.8 | 10.0 | 5.8 | 0.0 | 0.0 | .9 | 0.2 | 5.1 |
| 78 Recycle | 79.6 | 10.1 | 5.9 | 0.0 | 0.0 | .9 | 0.2 | 4.2 |
| 42 Feed | 85.0 | 9.3 | 5.4 | 0.0 | 0.0 | .9 | 0.2 | 0.0 |

Purge Rate: 12.0%
Make-up gas input: 251.2 scfm

Under these conditions the carbon dioxide concentration in the feed gas entering the ozone generator (at 42) reaches equilibrium 9.3 wt %. This is below the 10% level where the prior art predicts little affect on ozone generation. However, as discussed above and shown in FIG. 2, carbon dioxide concentrations of this level do have a significant impact on generation efficiency. Even though oxygen purity is 85 wt %, the ozone generator cannot operate at full capacity and will not produce 6 wt % ozone rich gas under these conditions.

Example II

Example II illustrates the operation of the purge only embodiment of FIG. 3 according to the teachings of the present invention. In order to maintain the carbon dioxide concentration in the feed gas at about 6 wt %, such that the ozone generator may operate at full capacity, the purge rate should be maintained at about 18.5%. The oxygen and contaminant level s under these conditions are shown in Table C:

TABLE B

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 83.7 | 6.6 | 3.8 | 0.3 | 0.2 | 90.4 | 0.2 | 5.1 |
| 74 Exhaust | 83.9 | 7.0 | 3.8 | 0.0 | 0.0 | .9 | 0.2 | 5.1 |
| 78 Recycle | 84.6 | 7.0 | 3.9 | 0.0 | 0.0 | .9 | 0.2 | 4.2 |
| 42 Feed | 90.4 | 6.0 | 3.4 | 0.0 | 0.0 | .9 | 0.2 | 0.0 |

Purge Rate: 18.5%
Make-up Gas Input: 387.4 scfm

The importance of the effect of carbon dioxide may be fully appreciated by comparing Tables A and B. In Table A oxygen purity is maintained at 85 wt % as required by the prior art, but carbon dioxide concentration rises to 9.3 wt % and the ozone generator is unable to operate at full capacity. In contrast, by controlling the process according to the present invention to maintain carbon dioxide concentration at about 6 wt %, the oxygen purity rises to about 90 wt %. This oxygen purity is higher than necessary, but it results from the fact that carbon dioxide concentration is maintained at the low 6 wt % level. Under these conditions additional savings could be realized by using a less expensive make-up gas that had a lower oxygen content.

Example III

Example III illustrates the benefits which can be realized in terms of reduced make-up gas requirements by flooding the hood of the dewatering press ("DWP") as shown in FIG. 5. However, in this example the purge rate is controlled according to the prior art, i.e. the only concern is maintaining oxygen purity at a level of 85 wt %. This level of oxygen purity can be achieved with a purge of only 8.3%. Table C shows the oxygen and contaminants in the system operated under these conditions:

TABLE C

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 79.6 | 14.1 | 0.3 | 0.3 | 0.6 | 93.1 | 0.3 | 5.0 |
| 74 Exhaust | 79.5 | 15.0 | 0.3 | 0.0 | 0.0 | .9 | 0.3 | 5.0 |
| 78 Recycle | 80.3 | 15.1 | 0.3 | 0.0 | 0.0 | .9 | 0.3 | 4.1 |
| 42 Feed | 85.0 | 14.4 | 0.3 | 0.0 | 0.0 | .9 | 0.3 | 0.0 |

Purge Rate: 8.3% with DWP flooded
Makeup Gas Input: 174.7 scfm

The amount of make-up gas required is substantially reduced; 174.7 scfm as compared to 251.2 scfm in Example I, which was also controlled according to the prior art to maintain an oxygen purity of 85%. For applications requiring ozone generation at relatively low weight percentages (i.e., about 1–3%), there is a savings in amount of make-up gas. However, the above preferred ozone generator is unable to generate 6 wt % ozone at the design flow rate because, by focusing on oxygen purity only, the carbon dioxide concentration in the feed gas rises to about 14.4 wt %.

Example IV

Example IV illustrates the operation of the purge only embodiment, controlled according to the present invention, with the hood of the dewatering press flooded with purge gas as shown in FIG. 5. Table D shows the oxygen and contaminant levels in the system:

TABLE D

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 87.3 | 6.6 | 0.2 | 0.3 | 0.3 | 90.9 | 0.2 | 5.1 |
| 74 Exhaust | 87.4 | 7.0 | 0.2 | 0.0 | 0.0 | .9 | 0.2 | 5.1 |
| 78 Recycle | 88.2 | 7.1 | 0.2 | 0.0 | 0.0 | .9 | 0.2 | 4.2 |
| 42 Feed | 93.5 | 6.0 | 0.3 | 0.0 | 0.0 | .8 | 0.2 | 0.0 |

Purge Rate: 19.2% with DWP flooded
Make-up Gas Input: 402.8 scfm

In the purge only embodiment, carbon dioxide concentration in the exhaust gas reaches equilibrium at about 7 wt %. This relatively high carbon dioxide content is also present in the purge gas. When the purge gas is reintroduced into the system with the pulp by flooding the DWP, a relatively large amount of carbon dioxide enters the recycle stream. Therefore, although nitrogen can be almost eliminated from the system by flooding the DWP, a slightly higher purge rate of 19.2% (compared to 18.5% in Example II) is required to compensate for carbon dioxide reintroduced with the pulp. By utilizing this higher purge rate, the carbon dioxide level is maintained at 6 wt % in the feed gas, so that the ozone generator can be operated at full capacity.

Example V

Example V illustrates the operation of the alkaline scrub embodiment as shown in FIG. 3 according to the present invention. In this example it is assumed that the alkaline scrubber has a 90% efficiency. That is, it continuously removes 90% of the carbon dioxide entering the scrubber. Under these conditions enough carbon dioxide is removed so that its concentration is not factor in determining the purge rate. Instead, a purge rate of only about 4.8% is required to maintain the necessary oxygen purity in the feed gas. Table E shows the oxygen and contaminant levels:

TABLE E

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 79.5 | 0.2 | 14.5 | 0.3 | 0.1 | 88.5 | 0.3 | 5.3 |
| 74 Exhaust | 79.7 | 0.3 | 14.5 | 0.0 | 0.0 | .9 | 0.3 | 5.3 |
| 78 Recycle | 80.4 | 0.3 | 14.6 | 0.0 | 0.0 | .9 | 0.3 | 4.4 |
| 42 Feed | 85.0 | 0.3 | 14.4 | 0.0 | 0.0 | .9 | 0.3 | 0.0 |

Purge Rate: 4.8%; 90% alkaline scrub
Make-up Gas Input: 121.9 scfm

In this instance, nitrogen introduced with the pulp is the primary contaminant which must be removed due to its effect as a diluent. The low purge rate achieves the necessary nitrogen removal.

Example VI

Example VI illustrates the operation of the alkaline scrub embodiment with the hood of the dewatering press flooded as shown in FIG. 5 according to the present invention. As in Example V, a 90% efficiency scrubber is assumed. Due to the displacement of nitrogen by oxygen in the hood of the dewatering press, the overall nitrogen level in the system is substantially reduced. Oxygen purity of 97.4 wt % is achieved with an actual purge rate of only about 1.5%. The oxygen and contaminant levels are shown in Table F:

TABLE F

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 92.1 | 0.2 | 1.1 | 0.3 | 0.1 | 90.5 | 1.1 | 5.1 |
| 74 Exhaust | 92.4 | 0.3 | 1.1 | 0.0 | 0.0 | .9 | 1.1 | 5.2 |
| 78 Recycle | 93.2 | 0.3 | 1.1 | 0.0 | 0.0 | .9 | 1.1 | 4.3 |
| 42 Feed | 97.4 | 0.3 | 1.1 | 0.0 | 0.0 | 1.0 | 1.1 | 0.0 |

Purge Rate: 1.5%; 90% alkaline scrub with DWP flooded
Make-up Gas Input: 53.1 scfm Substantial cost savings can be realized due to the reduced purge rate which, in turn, is directly related to the reduced amount of make-up gas to be added. The make-up gas input required is only 53.1 scfm as compared to 121.9 scfm in Example V.

Example VII

Example VII also illustrates the operation of the alkaline scrub embodiment without the hood of the dewatering press flooded by the purge gas according to the present invention. Again, a 90% scrubber efficiency is assumed. However, for purposes of comparison with Example VI, the purge rate is selected to provide an oxygen purity of 97.4 wt % in the feed gas. In order to obtain the same oxygen purity as in Example VI, without using the purge gas to flood the hood of the dewatering press, the purge rate must be about 27.8%. At this purge rate the make-up gas input required is 604.8 scfm—over ten times that required in Example VI. Table G shows the oxygen and contaminant levels in the system:

TABLE G

| Stream Location | $O_2$ | $CO_2$ | $N_2$ | $O_3$ | CO | $CH_4$* | Ar | $H_2O$ |
|---|---|---|---|---|---|---|---|---|
| 54 Exhaust | 91.4 | 0.2 | 2.7 | 0.3 | 0.1 | 90.0 | 0.2 | 5.2 |
| 74 Exhaust | 91.6 | 0.3 | 2.7 | 0.0 | 0.0 | .9 | 0.2 | 5.2 |
| 78 Recycle | 92.5 | 0.3 | 2.7 | 0.0 | 0.0 | .9 | 0.2 | 4.3 |
| 42 Feed | 97.4 | 0.2 | 2.1 | 0.0 | 0.0 | .7 | 0.3 | 0.0 |

Purge Rate: 27.8%; 90% alkaline scrub
Make-up Gas Input: 604.8 scfm

The advantages of flooding the hood of the dewatering press are clear from a comparison of Examples VI and VII.

The detailed description of the preferred embodiments contained herein is intended in no way to limit the scope of the invention. Based on the above examples and teachings of the effects of carbon dioxide provided herein, persons skilled in the art will be able to select the appropriate combination of contaminant removal parameters and make-up gas additions to provide both improved operating efficiency and increased cost savings for operation of a particular ozone generation system. The preferred embodiments described above are not mutually exclusive of one another. For example, the PSA unit according to the present invention may be utilized to remove contaminants from the purged recycle gas of the purge embodiment. The PSA cleaned purge gas then may be directed to the ozone generator or to the hood of the dewatering press. As will be apparent to a person of ordinary skill in the art, various other modifications and adaptions of the structure above described are possible without departure from the spirit and scope of the invention; the scope of which is defined in the appended claims.

What is claimed is:

1. A method for conditioning an ozone gas recycle stream in an ozone pulp bleaching process, comprising:

providing an oxygen containing feed gas to an ozone generator;

generating ozone from said feed gas to produce an ozone rich oxygen gas;

bleaching pulp with said ozone rich gas, thereby producing an exhaust gas containing contaminants including carbon dioxide;

removing at least some of said contaminants to produce a recycle gas; and directing said recycle gas into the ozone generator to provide at least a portion of said oxygen containing feed gas;

wherein said step of removing contaminants comprises removing entrained pulp fibers from said exhaust gas; removing ozone and a portion of the carbon monoxide by passing the gas through a thermal destruct unit; removing hydrocarbons and the remaining carbon monoxide from the gas which exits the thermal destruct unit; purging a portion of the exhaust gas; forming the recycle gas by cooling and drying the unpurged portion of said exhaust gas; and mixing said recycle gas with fresh oxygen containing gas to form the feed gas, thus maintaining the concentration of carbon dioxide in the feed gas at a level of about 6 wt. % to allow approximately full capacity operation of the ozone generator.

2. The method according to claim 1, wherein the exhaust gas is scrubbed with an alkaline material to also remove a portion of the carbon dioxide; and further comprising supplying the alkaline material from a wood pulping plant liquor recovery system.

3. The method according to claim 1, wherein the exhaust gas is scrubbed with an alkaline material to also remove a portion of the carbon dioxide; and said alkaline material comprises caustic soda, hydrated lime, oxidized white liquor or a mixture thereof.

4. The method according to claim 3, further comprising supplying the caustic soda from an extraction stage sodium hydroxide source of an associated pulp bleaching process.

5. The method according to claim 1 which further comprises reducing the nitrogen content of the exhaust gas by replacing nitrogen in the pulp with an oxygen rich gas that contains at least about 50% oxygen.

6. The method according to claim 5 which further comprises using at least part of the purged exhaust gas portion as the oxygen rich gas.

7. The method according to claim 1 wherein the step of removing hydrocarbons comprises passing the exhaust gas through a catalytic destruct unit.

8. The method according to claim 1 wherein the step of removing hydrocarbons comprises passing the exhaust gas through an apparatus that contains an adsorbent which adsorbs hydrocarbons.

9. The method according to claim 1 wherein the pulp fibers are removed by scrubbing the exhaust gas with water.

10. The method according to claim 1 which further comprises scrubbing the exhaust gas with an alkaline material to remove carbon dioxide.

11. The method according to claim 10, further comprising:

purging up to about 5% of said exhaust gas after said scrubbing; and maintaining a constant flow rate into the ozone generator by supplying an amount of fresh oxygen containing gas substantially equivalent to the amount of said exhaust gas purged and carbon dioxide removed by scrubbing.

12. The method according to claim 1 wherein the carbon monoxide and hydrocarbon removal steps occur prior to the purging step.

13. A method for conditioning an ozone gas recycle stream in an ozone pulp bleaching process, comprising:

providing an oxygen containing feed gas to an ozone generator;

generating ozone from said feed gas to produce an ozone rich oxygen gas;

increasing the consistency of a pulp;

bleaching the increased consistency pulp with said ozone rich oxygen gas, thereby producing an exhaust gas containing contaminants including carbon dioxide;

producing a recycle gas by removing ozone and purging a portion of the exhaust gas to remove at least some of said contaminants including carbon dioxide in an amount sufficient to allow operation of the ozone generator at or approaching full capacity;

directing at least a portion of the purged exhaust gas portion to surround the pulp during at least part of said pulp consistency increasing step, thereby displacing ambient air thereby reducing the nitrogen about the pulp with said exhaust gas;

filling voids between individual particles of said pulp with said exhaust gas as the consistency of the pulp is increased;

directing said increased consistency pulp with voids filled by said exhaust gas to the pulp bleaching step; and directing said recycle gas into the ozone generator to provide at least a portion of said oxygen containing feed gas.

14. The method according to claim 13, wherein up to about 20% of the exhaust gas is purged and directed to the pulp consistency increasing step and the oxygen concentration in said exhaust gas is greater than about 80 wt %.

15. The method according to claim 13 which further comprises scrubbing the exhaust gas with water to remove pulp fibers.

16. The method according to claim 13 which further comprises scrubbing the exhaust gas with an alkaline material to remove carbon dioxide.

17. The method according to claim 13 which further comprises additionally removing carbon monoxide or hydrocarbons contaminants from the exhaust gas.

18. The method according to claim 17 wherein the additional contaminant removal step occurs prior to the purging step.

19. The method according to claim 17 which further comprises removing hydrocarbons by passing the exhaust gas through an apparatus that contains an adsorbent which adsorbs hydrocarbons.

* * * * *